UNITED STATES PATENT OFFICE.

LOUIS H. FLANDERS, OF EDGEWOOD PARK, PENNSYLVANIA, ASSIGNOR, BY MESNE ASSIGNMENTS, TO WESTINGHOUSE STORAGE BATTERY COMPANY, A CORPORATION OF NEW YORK.

METHOD OF TREATING ELECTRODES.

953,601.  Specification of Letters Patent.  Patented Mar. 29, 1910.

No Drawing.  Application filed February 23, 1909.  Serial No. 479,560.

*To all whom it may concern:*

Be it known that I, LOUIS H. FLANDERS, a citizen of the United States, and a resident of Edgewood Park, in the county of Allegheny and State of Pennsylvania, have made a new and useful Invention in Methods of Treating Electrodes, of which the following is a specification.

This invention relates to secondary or storage batteries and more particularly to electrodes or storage battery plates of the "pasted" type. There are two types of pasted plates employed in storage batteries. The common type or that most in use comprises a grid which is completed either by casting or some other suitable process and to which oxid is then applied. The second type which is the more uncommon type is generally known as the box or receptacle type and it is ordinarily made by completing a portion of the grid then applying the oxid to become active and then adding the remaining portion of the grid and fastening it to the first portion by welding, by riveting or by some other suitable method the resultant plate generally being relatively thin. One reason for employing the cumbrous method of applying the paste or oxid to the box type of plate in the manner specified is because it is believed that it is impossible to apply the paste or oxid to the completed grid. The common form of box type of plate consists of a supporting and conducting interior grid and sides or covers of lead veneer which have relatively small holes punched or otherwise formed therein. It has been found that the lead veneer covers provided with small holes or interstices do not admit of a ready application of the paste from the exterior after the grid sides and cover are assembled. Therefore, it has been heretofore the practice to apply the paste from the inside, that is, before the edges have been assembled or before the last sheet of lead veneer is applied to the otherwise finished grid. Presumably because of the supposed difficulty in introducing the paste through these small holes so as to cause it to enter the paste holding interior of the plates, the plates which have grown useless in service after a time because of the loss of active material (but which are in good condition as regards the grid portion and which generally contains some active material) have been discarded as scrap.

I have found that by using a relatively thin wash or paste, that is a fluid containing active material in suspension rather than a stiff paste of lead oxid, the so called exhausted plates containing some active material which have heretofore been thrown into the scrap may be easily repasted thus saving the labor and expense of remelting the old grids and remaking them. I have also found that the active material may be applied to new plates in the same way. I prefer to use for pasting either the old or new grids a paste of thinner consistency than ordinarily employed, heretofore said paste being preferably made of lead oxids or oxid and water to which may be added if desired some inert material, for example, lamp black or finely powdered kaolin. I find that the paste gives good results when made of a consistency adapted to be worked by a brush that is about the consistency of cream and I find that the paste is best applied with a stiff brush rather than with a trowel and that the operation is facilitated by placing the plate upon a porous matting or pulp board whereby some of the water from the paste is absorbed so as to cause the paste to set. The use of the brush instead of the trowel also avoids the liability of the plate becoming dented or marred while the paste is being applied. The pasting or repasting of the plate is carried on quickly and uninterruptedly; that is to say the active material is worked in through the openings in the wall of the plate at one operation, the water or a large portion of it being carried away by the porous matting or pulp board. By the time the working in has been accomplished enough moisture has been absorbed to leave a solid mass in the receptacle of the plate. After the grids are pasted they may be stored direct for service or hardened and seasoned by immersion while still wet in a solution of sulfuric acid or ammonium sulfate or any other suitable media.

While I have described a well known type of pasted plate, it is to be understood that I do not limit myself to this particular type but reserve the right to practice the art on whatever type of plate is adapted to be treated.

What I claim as my invention is:

1. The herein described method of repasting worn out storage battery plates containing some active material, which consists in placing the plate to be treated upon a moisture removing bed then working liquid, containing active material in suspension, through openings in a wall of the plate and removing the plate from the bed after superfluous moisture has been removed from the active material.

2. The herein described method of repasting worn out storage battery plates containing some active material, which consists in placing the plate to be treated upon a moisture removing bed, then brushing liquid, containing active material in suspension, through openings in a wall of the plate and removing the plate from the bed after superfluous moisture has been removed from the active material.

In testimony whereof, I have hereunto subscribed my name this 20th day of February, 1909.

LOUIS H. FLANDERS.

Witnesses:
C. W. McGHEE,
B. F. FUNK.